(12) United States Patent
Hishikawa

(10) Patent No.: US 6,643,089 B1
(45) Date of Patent: Nov. 4, 2003

(54) MAGNETIC DISK SYSTEM WITH SELECTION OF SECTOR ACCESS MODE BASED ON ACCESS STATE

(75) Inventor: Tetsuyuki Hishikawa, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/449,547

(22) Filed: Nov. 29, 1999

(30) Foreign Application Priority Data

Nov. 27, 1998 (JP) .......................................... 10-336990

(51) Int. Cl.⁷ ................................................ G11B 5/55
(52) U.S. Cl. ..................................... 360/78.04; 711/112
(58) Field of Search .............................. 360/48, 78.04, 360/75; 711/112, 167, 170, 173

(56) References Cited

U.S. PATENT DOCUMENTS

| | | | |
|---|---|---|---|
| 5,657,468 A | * | 8/1997 | Stallmo et al. ............. 711/114 |
| 6,034,837 A | * | 3/2000 | Purkett ..................... 360/48 X |
| 6,137,644 A | * | 10/2000 | Hetzler et al. ................ 360/48 |

FOREIGN PATENT DOCUMENTS

| | | |
|---|---|---|
| JP | 5-74040 | 3/1993 |
| JP | 5-325395 | 12/1993 |
| JP | 6-67812 | 3/1994 |
| JP | 6-44695 | 6/1994 |

* cited by examiner

*Primary Examiner*—David Hudspeth
*Assistant Examiner*—James L Habermehl
(74) *Attorney, Agent, or Firm*—Foley & Lardner

(57) ABSTRACT

The magnetic disk system in which a disk controller for controlling data reading and writing from and to a plurality of magnetic disk mediums while making magnetic heads seek, said magnetic disk mediums being formatted by a plurality of tracks and sectors into which the tracks are divided in a circumferential direction, includes format selecting means for selecting either a first format of continuing the sector number from a track on a magnetic disk medium to a track on another magnetic disk medium in the same cylinder or a second format of continuing the sector number from a track on a magnetic disk medium to another track on the same recording surface, hence to format the magnetic disk mediums.

13 Claims, 5 Drawing Sheets

MAGNETIC DISK SYSTEM WITH SELECTION OF SECTOR ACCESS MODE BASED ON ACCESS STATE

BACKGROUND OF THE INVENTION

1. Field of the Invention

The present invention relates to a magnetic disk system, and more particularly to a magnetic disk system in which a spindle motor supports a plurality of magnetic disk mediums.

2. Description of the Related Art

A magnetic disk system represented by a hard disk is widely used as an internal or external auxiliary mass-storage device of a personal computer (PC) or the like. With an increasing capacity, a plurality of magnetic disk mediums is generally used in a magnetic disk system. The magnetic disk mediums are rotated in a state of being fixed to a spindle which is driven by a motor, and the data is read and written therefrom and therein while magnetic heads positioned on the both sides of each magnetic disk medium in a floating state move in a radius direction by the drive of access arms.

The magnetic disk medium is formed by uniformly applying the magnetic material to a metallic disk and formatted according to the predetermined standard. A lot of magnetic bands referred to as a track are formed concentrically on the magnetic disk medium and each track is divided into section referred to as a sector, in a circumferential direction. A group of several sectors is referred to as a cluster. A plurality of magnetic heads respectively provided to the magnetic disk mediums is moved integrally and each magnetic head is arranged to be positioned on the same track (on the concentric circles) of each magnetic disk medium. A group of tracks positioned at the same distance from the center of a plurality of magnetic disk mediums is referred to as a cylinder.

FIG. 5 shows the principle of access in the conventional magnetic disk system. For convenience's sake, a magnetic disk system having two magnetic disk mediums 71 and 72 will be described here. In the conventional magnetic disk system, continuity of sectors is defined by the cylinder, in order to assure efficiency of access.

More specifically, assuming that access starts from the sector address "1" of the magnetic disk medium 71, the adjacent sector address "2" of the same track is next accessed, and thereafter the sectors from the address "3" to the last address "100" of the same track are sequentially accessed. Access to the sector address "101" is obtained from a given sector of the magnetic disk medium 72 positioned in the same cylinder, not from the magnetic disk medium 71. That is, the access to the sector address "101" is obtained by another magnetic head. After the access to the sector address "101", the sector address "102" adjacent to the sector address "101" on the same track is accessed, thereinafter each adjacent sector address is accessed one after another until the last sector address "200" on the same cycle is accessed.

The above-mentioned conventional magnetic disk system, however, has a problem in that when lessening the space between a magnetic head and a magnetic disk medium for improving surface density, micro dusts lying in this space will damage the stable floating characteristic of a magnetic head and easily cause a head crash. The surface density is closely related to the space between a magnetic head and a magnetic disk medium; specifically, as the space becomes narrower, the surface density is further improved, while the system is more easily influenced by the micro dusts. Thus, in order to reduce the probability of producing a head crash, there exists a system having an additional function (referred to as "patrol seek") of moving a head at regular intervals of, time so that the micro dusts should not accumulate.

As computer systems develop, the storing capacity of a magnetic disk system is increased. Concretely, the surface density has increased at an annual rate of 60% or so. As a result, makers of a magnetic disk system are changing the model of a magnetic disk system every year to ship the magnetic disk system whose capacity is doubled.

Therefore, a magnetic disk system of a small capacity will disappear from the market in a year or so, becoming obsolete in a short time. The above-mentioned patrol seek cannot move a magnetic head without the range that has been adjusted to the disk capacity at system construction; accordingly, when a magnetic disk system of a large capacity is newly mounted on an old-fashioned system, it is impossible to perform the patrol seek on the portion beyond the capacity of the old system.

Further, since the continuity of the sectors is assured by the track on a recording surface, the range to be patrolled on the recording surface is restricted. In other words, access is not uniformly made on the whole recording surface but concentrates on a given area. Therefore, at the power-on and off, when a magnetic head having been saved at the inner circumferential portion returns to the access area again, there increases the probability of passing over micro dusts, which results in increasing the probability of causing a head crash.

SUMMARY OF THE INVENTION

An object of the present invention is to provide a magnetic disk system capable of reducing head crash caused by micro dusts by enabling the patrol seek over the whole disk medium.

According to one aspect of the invention, a magnetic disk system comprises means for supporting and rotating a plurality of magnetic disk mediums formatted by a plurality of tracks and sectors into which the tracks are divided in a circumferential direction, magnetic heads respectively positioned on each recording surface of the plurality of magnetic disk mediums, for reading and writing data from and to the magnetic disk mediums, means for instructing the magnetic heads to perform a seek operation, and control means for controlling data reading and writing from and to the magnetic disk mediums during the seek operation, the control means including format selecting means for selecting either a first format continuing the order of the sectors from a track on a magnetic disk medium to a track on another magnetic disk medium in the same cylinder, or a second format continuing the order of the sectors from a track on a magnetic disk medium to another track on the same recording surface, then to format the magnetic disk medium.

In the preferred construction, the format selecting means formats the magnetic disk mediums in such a way that the order of the sectors is continuous from the outermost circumferential track to the inner track of the magnetic disk medium, in the second format.

In another preferred construction, the format selecting means formats the magnetic disk mediums in such a way that the order of the sectors is continuous from the most inner track to the outer track of the magnetic disk medium, in the second format.

According to another aspect of the invention, a magnetic disk system comprises means for supporting and rotating a plurality of magnetic disk mediums having recording surfaces formatted with a plurality of tracks, each track divided into sectors in a circumferential direction, magnetic heads respectively positioned on each recording surface of the plurality of magnetic disk mediums, for reading and writing data from and to the magnetic disk mediums, means for instructing the magnetic heads to perform a seek operation, and control means for controlling data reading and writing from and to the magnetic disk mediums while the seek operation is performed, the control means including determining means for determining an access state of the magnetic disk mediums by the magnetic heads, and access selecting means for selecting either a first mode of accessing the sectors from a track on a magnetic disk medium to a track on another magnetic disk medium in the same cylinder or a second mode of accessing the sectors from a track on a magnetic disk medium to another track on the same magnetic disk medium based on the access state, and then accessing the magnetic disk mediums according to the selected mode.

In the preferred construction, the access selecting means accesses the magnetic disk mediums in such a way that the order of the sectors is continuous from the outermost circumferential track to the inner track of the magnetic disk medium in the second mode.

In another preferred construction, the access selecting means accesses the magnetic disk mediums in such a way that the order of the sectors is continuous from the most inner track to the outer track of the magnetic disk medium in the second mode.

In another preferred construction, the access selecting means checks whether access is concentrated in only one area of a track of the magnetic disk medium more than a predetermined period during the access state; when access is not concentrated more than a predetermined period, the means selects the first mode, while when access is concentrated, the means selects the second mode.

In another preferred construction, the access selecting means checks whether access is concentrated in only one area of a track on the magnetic disk medium more than a predetermined period during the access state; when access is not concentrated more than a predetermined period, the means selects the first mode, while when access is concentrated, the means selects the second mode, and after selecting the second mode, the means switches the second mode to the first mode when a predetermined period has elapsed.

Other objects, features and advantages of the present invention will become clear from the detailed description given herebelow.

BRIEF DESCRIPTION OF THE DRAWING

The present invention will be understood more fully from the detailed description given herebelow and from the accompanying drawings of the preferred embodiment of the invention, which, however, should not be taken to be limitative to the invention, but are for explanation and understanding only.

In the drawings.

DESCRIPTION OF THE PREFERRED EMBODIMENT

The preferred embodiment of the present invention will be discussed hereinafter in detail with reference to the accompanying drawings. In the following description, numerous specific details are set forth in order to provide a thorough understanding of the present invention. It will be obvious, however, to those skilled in the art that the present invention may be practiced without these specific details. In other instances, well-known structures are not shown in detail in order to not unnecessarily obscure the present invention.

Figure 1:
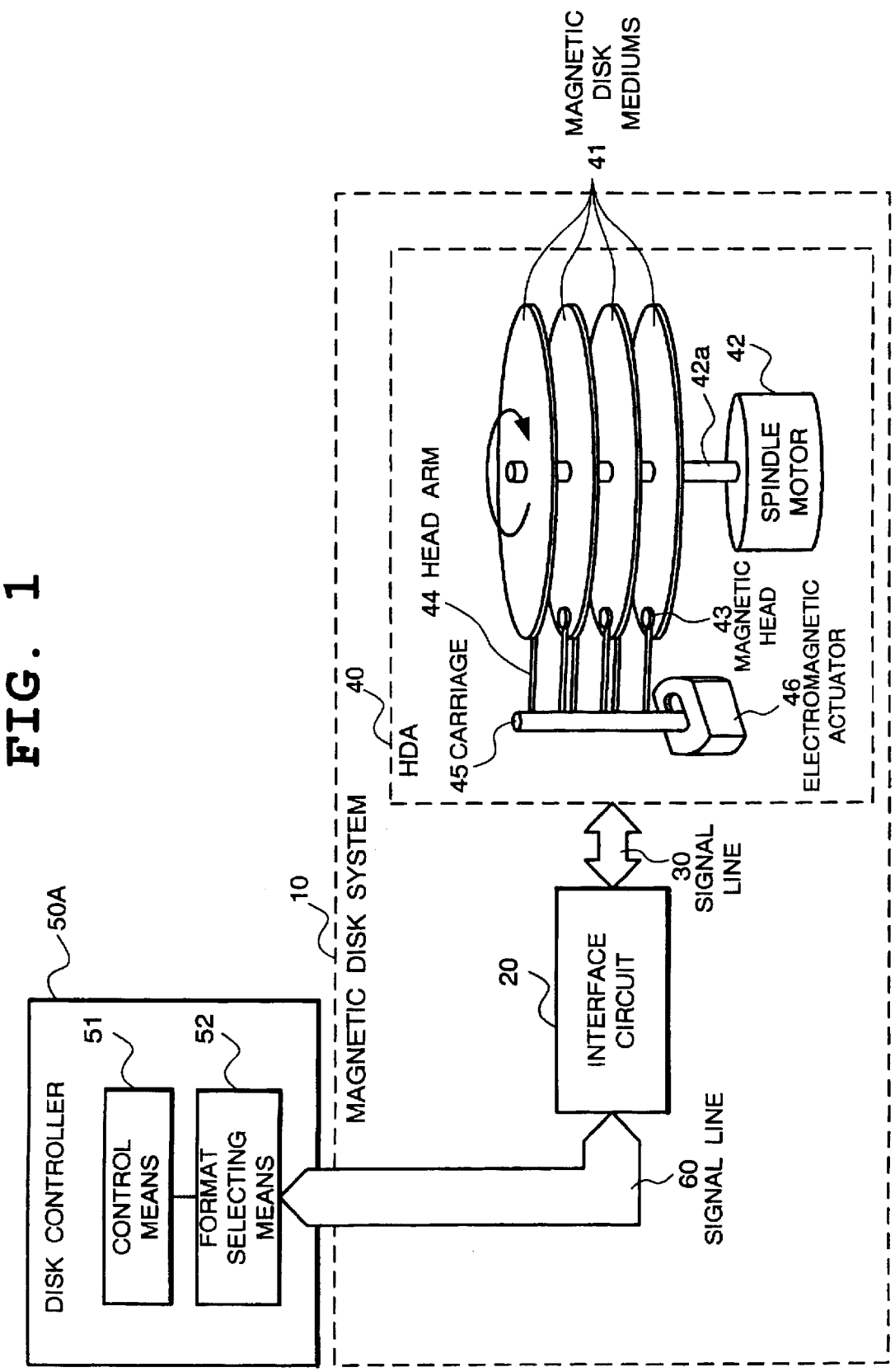
FIG. 1 is a block diagram showing the structure of a magnetic disk system according to a first embodiment of the present invention.
Figure 2:
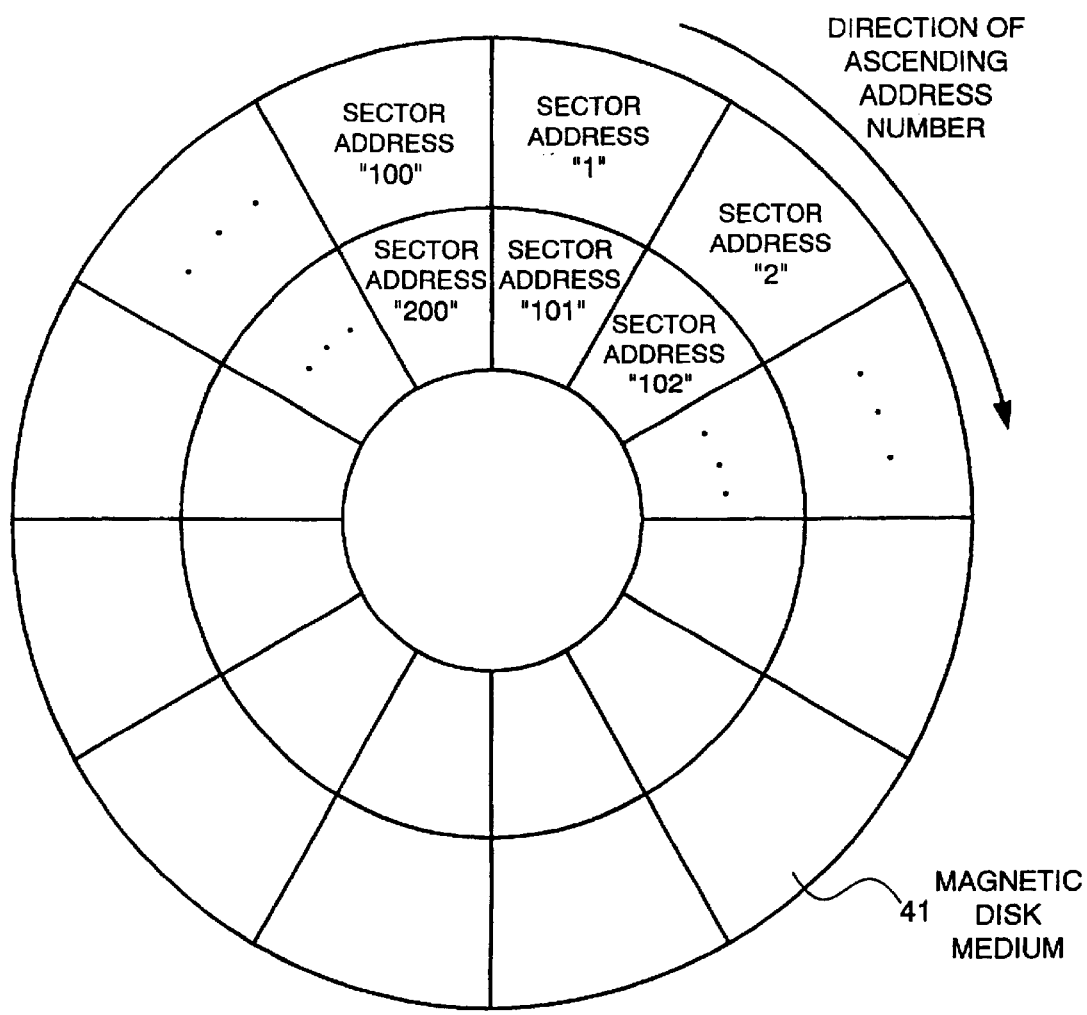
FIG. 2 is a view for use in describing the principle of access in the magnetic disk system according to the present invention.

FIG. 1 shows the structure of a magnetic disk system according to a first embodiment of the present invention. FIG. 2 shows the principle of access in the magnetic disk system according to the first embodiment. The magnetic disk system 10 of this embodiment is designed to be able to select the conventional format (format A) of moving to a track on a recording surface of another magnetic disk medium in the same cylinder, or a new format (format B) of moving to another track on a recording surface of the same magnetic disk medium so as to access the other track, after finishing access to all the sectors (here, assuming that one track consists of 100 sectors) of one cycle in a circumferential direction.

In the new format B, sector number (sector address) is attached in ascending order, starting from the outermost circumferential (or the innermost) track of the magnetic disk mediums 41, and after finishing the assignment in the track, the successive sector number is assigned in an inner (or outer) track. The assignment is continued to the innermost track (or the outermost circumferential track) through the sequential performance of this operation.

For example, in the format of assigning each sector address to the sectors starting from the outermost circumferential track to the inner track according to the format B, when finishing access to the sector addresses "1" to "100" of the outermost circumferential track, the sector addresses "101" to "200" of the adjacent inner track are sequentially accessed, as illustrated in FIG. 2.

Namely, even if access to one track is complete, access is not moved to a track on the back surface of the magnetic disk medium or a track on another magnetic disk medium in the same cylinder, but to another track on the same magnetic disk medium.

At a time of initial setting of the magnetic disk system 10, a disk controller 50A selects the above format A or the new format B. According to a command output from the disk controller 50A (format command), a head disk assembly (HDA) 40 is controlled and a magnetic disk medium 41 is formatted with the format A or the format B.

Thus, since the continuity of the sectors on the same magnetic disk medium 41 is assured, even if the access area actually accessed is of small capacity, the patrol seek over the whole surface is possible.

Selection of the format A or the format B is decided based on the access state (access frequency or the like) to another track in the magnetic head 43 of the HDA 40. Specifically, micro dusts are liable to accumulate on a track where the magnetic head 43 is standing for a long time, and a head crash may occur in some cases.

Although the case of seeking from the outermost portion to the inner portion is shown in FIG. 2, it may be designed to seek from the innermost portion to the outer portion, or move from a given track to an outer track or an inner track.

Now, the structure of the magnetic disk system according to the first embodiment of the present invention will be described as shown in FIG. 1.

The magnetic disk system 10 according to the first embodiment is connected to the disk controller 50A (for example, an LSI for controller built in a personal computer) via a control signal line 60. The magnetic disk system 10 comprises an interface circuit 20 connected to the control signal line 60 and the HDA (Head Disk Assembly) 40 connected to the interface circuit 20 via the control signal line 30.

The disk controller 50A includes a control means 51 for controlling writing and reading data to and from the magnetic disk system 10 and a format selecting means 52 for selecting the format of the magnetic disk medium 41 corresponding to the above-mentioned format A or format B. Selection of the mode by the format selecting means 52 is performed at a time of initial setting of the magnetic disk system 10.

The HDA 40 is provided with a plurality of magnetic disk mediums 41 as a storing medium. The plurality of magnetic disk mediums 41 are supported.by one rotating axis 42a at regular intervals. The rotating axis 42a is coupled to a rotating axis of the spindle motor 42. The spindle motor 42 drives the magnetic disk mediums 41 to rotate integrally in a direction of the arrow in FIG. 1.

A plurality of magnetic heads 43 are provided on one side or on the opposite sides of the respective magnetic disk mediums 41 in a manner of mutually facing to the disk surface with a very little space. The magnetic heads 43 are integrally supported by a carriage 45 via the respective head arms 44, and the rotary portion is coupled to an electromagnetic actuator 46. The electromagnetic actuator 46 is controlled by a signal from the interface circuit 2, so that the magnetic heads 43 may seek in a radius direction of the magnetic disk mediums 41. The respective magnetic heads 43 read and write the data from and to the respective magnetic disk mediums 41.

The interface circuit 20 is provided with, for example, SCSI (Small Computer System Interface) as an interface for controlling the HDA 40. The continuity of the sectors that are the minimum unit of data writing and reading is preserved in the magnetic disk mediums 41 by the interface circuit 20.

A sector number (sector address) is assigned to the sectors, that is the minimum unit of writing and reading, existing in each track of the magnetic disk mediums 41, for example, in ascending order starting from a track, in the outermost circumferential portion, as illustrated in FIG. 2, and when finishing the assignment in the corresponding track, sector numbers are continuously assigned in the next track. Through sequential performance of this operation, the assignment is continued to the innermost track.

The operation of the magnetic disk system constituted as shown in FIG. 1 will be described now.

In the initial setting of the magnetic disk system 10, the format selecting means 52 of the disk controller 50A selects the format of the magnetic disk system 10.

Figure 5:
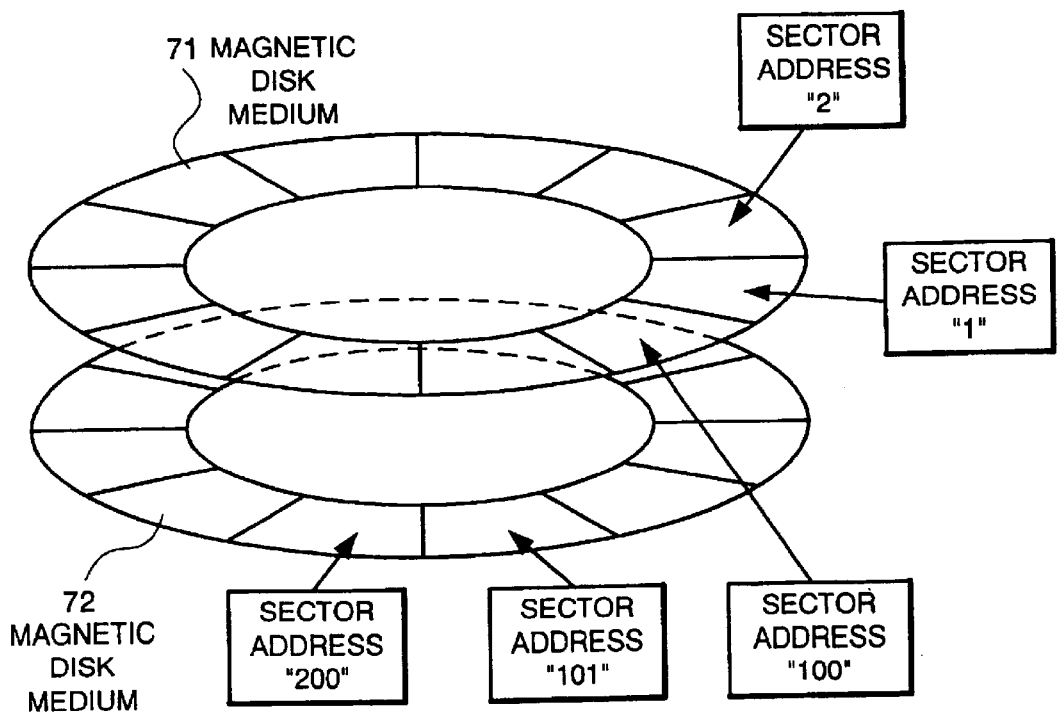
FIG. 5 is a view for use in describing the principle of access in the conventional magnetic disk system.

When selecting the same format A as the conventional one, the disk controller 50A formats the magnetic disk medium 41 of the HDA 40 as illustrated in FIG. 5.

When selecting the new format B, the disk controller 50A formats the magnetic disk mediums 41 of the HDA 40 as illustrated in FIG. 2. That is, a sector number (sector address) is attached to the sectors in ascending order starting from the outermost circumferential track of the magnetic disk mediums 41, and when finishing the assignment in the track, a successive sector number is assigned in an inner track.

Format B may be a format of seeking f rpm the innermost portion to the outer portion or seeking from a given track to the outer track or the inner track. Thus, a format B can be selected other than the format of seeking from the outermost portion to the inner portion.

Generally, the data reading and writing operation from and to the magnetic disk system 10 at a lower level, controlled by the disk controller 50A at an upper level is executed by the sector units. However, the reading and writing operation is not always executed. When there is no access, the magnetic head 43 is positioned on a track wherein the sector last accessed is located. If this state continues, micro dusts are liable to accumulate between the magnetic head 43 and the magnetic disk mediums 41 and therefore the head becomes incapable of reading data. In short, a head crash easily occurs. Thus, in order to prevent the head crash, the disk controller 50A supplies a control signal for performing a reading operation at regular intervals of time to the magnetic disk system 10 and moves the magnetic heads 43 to a given position within the access area.

Now, the magnetic disk system according to a second embodiment of the present invention will be described with reference to FIG. 3.

In the magnetic disk system 10 of this embodiment, the magnetic disk medium 41 is formatted in the conventional way, and after access to all the sectors for one track in a circumferential direction (here assuming that one track consists of 100 sectors), the magnetic disk system 10 is designed to select the conventional access mode (access mode A) of moving to a track on a recording surface of another magnetic disk medium in the same cylinder, or the new access mode (access mode B) of moving to another track on the recording surface of the same magnetic disk medium so as to access that track, during data access.

In the new access mode B, data writing and reading is performed in the order of sector number (sector address) starting from the outermost circumferential (or the innermost) track of the magnetic disk medium 41, and after finishing the access to the track, data writing and reading is performed from the sector of the inner (or outer) track. The sequential performance of this operation results in access to the innermost track (or the outermost track).

For example, when accessing the magnetic disk medium 41 of the format as shown in FIG. 5 according to the access mode B, upon completion access to all the sector addresses "1" to "100" of the outermost circumferential track, the sector addresses "301" to "400" of the adjacent inner track are sequentially accessed. The sector addresses to be accessed are not necessarily continuous in this access mode B.

That is, even if access to one track is complete, access is not moved to a track on the back surface of the magnetic disk medium or a track on another magnetic disk medium in the same cylinder, but moved to another track on the same magnetic disk medium.

A disk controller 50B automatically selects the above access mode A or the new access mode B according to the access state (access frequency) to a track of the magnetic disk mediums 41. The HDA 40 is controlled according to a command output from the disk controller 50B, and the magnetic disk medium 41 is accessed according to the access mode A or the new access mode B.

For example, when access is concentrated on the same track of the magnetic disk medium 41, it is switched to the access mode B of accessing another track on the same magnetic disk medium. Thus, selecting the access mode depending on the access state enables the patrol seek all over the surface even when the access area actually accessed is of small capacity.

Figure 3:
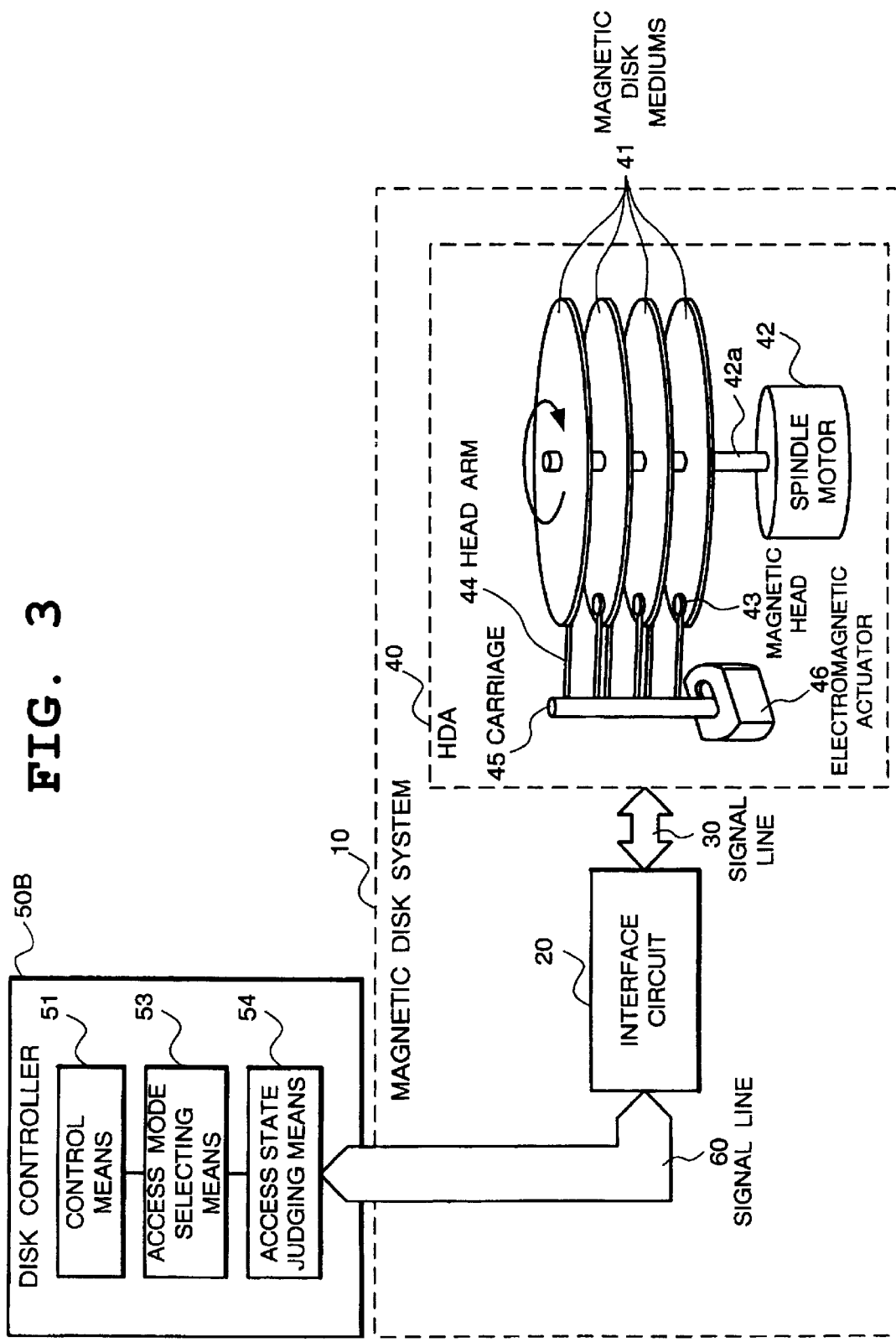
FIG. 3 is a block diagram showing the structure of the magnetic disk system according to a second embodiment of the present invention.

In FIG. 3, the magnetic disk system 10 according to the second embodiment is provided with the disk controller 50B, instead of the disk controller. 50A of the first embodiment of FIG. 1, and the other components are identical to those of FIG. 1.

The disk controller 50B comprises a control means 51 for controlling reading and writing data from and to the magnetic disk system 10, an access mode selecting means 53 for selecting the above-mentioned access mode A or access mode B, and an access state determining means 54 for determining the access state to the magnetic disk medium 41 of the magnetic disk system 10. According to the access state determined by the access state determining means 54, the access mode selecting means 53 selects the access mode A or the access mode B.

Figure 4:
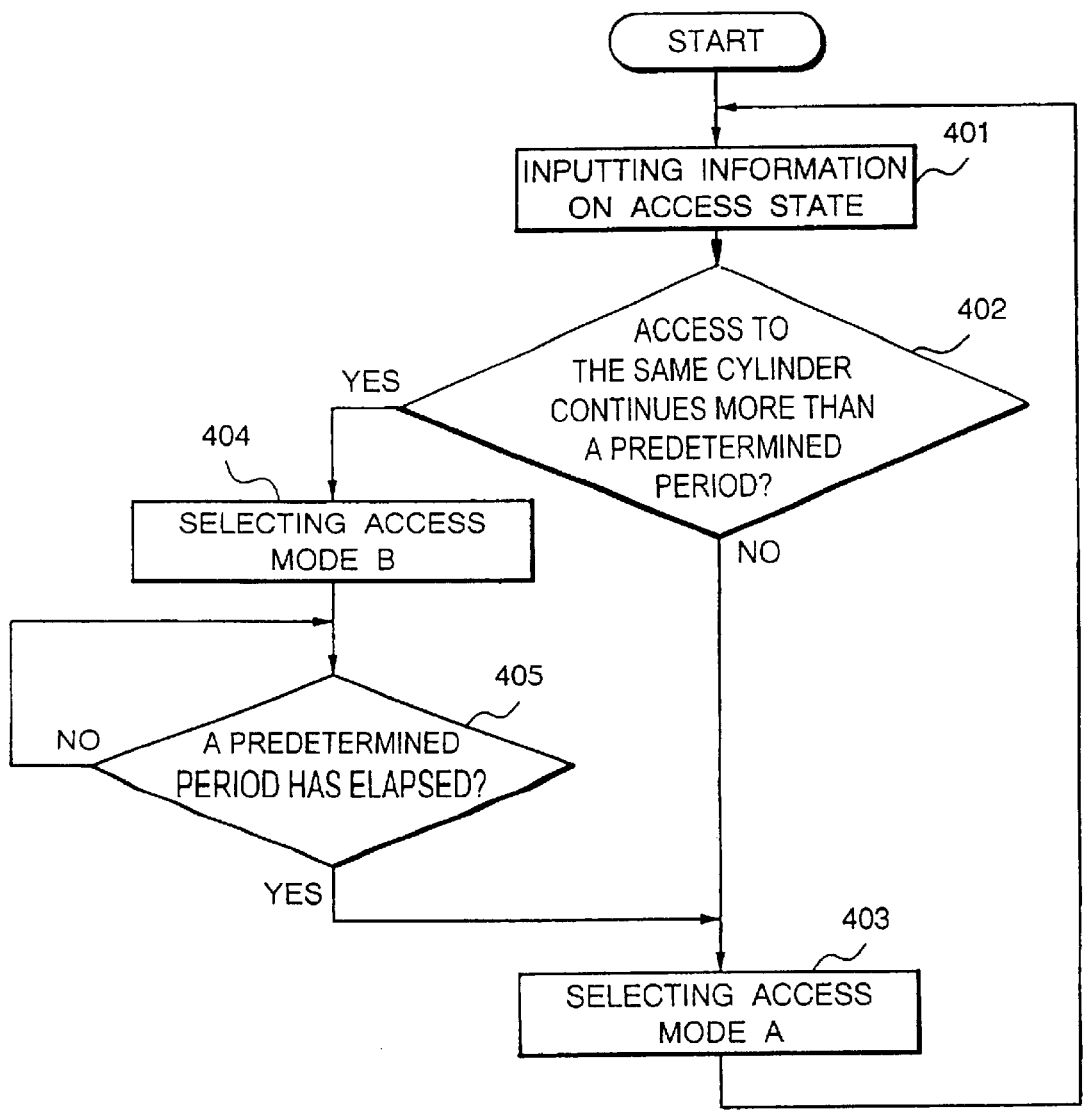
FIG. 4 is a flow chart for use in describing the operation of the magnetic disk system according to the second embodiment of the present invention.

The operation of the magnetic disk system constituted as shown in FIG. 3 will be described according to the flow chart of FIG. 4.

At first, the access state determining means 54 always monitors the access state to the magnetic disk mediums 41 and notifies the access mode selecting means 53 of the access state. In the initial state, the access mode A in the conventional way is to be selected by the access mode selecting means 53.

The access mode selecting means 53 checks whether only one area of the track on the magnetic disk medium 41 is being accessed more than a predetermined period (Step 402), upon receipt of the access state from the access state determining means 54 (Step 401).

If access is not concentrated only on one part of the same track on the magnetic disk medium 41 more than a predetermined period, the access mode A is maintained (Step 403).

When access is concentrated on one part of the same track on the magnetic disk medium 41 more than a predetermined period, the access mode A is switched to the access mode B (Step 404).

Thereafter, it checks whether the access in the access mode B has continued for a predetermined period (Step 405). When the access has continued, the access mode B is switched to the access mode A (Step 403). After switching to the access mode A, the process returns to Step 401, where the above processing is repeated.

When there is no data access, the magnetic head 43 is positioned on a track in which the sector of the final access is located. If this state continues, micro dusts are liable to accumulate between the magnetic head 43 and the magnetic disk medium 41, and the head may become incapable of reading data. In short, a head crash easily occurs. Thus, in order to prevent the head crash, the disk controller 50A supplies a control signal for performing the reading operation at regular intervals of time to the, magnetic disk system 10 and moves the magnetic head 43 to a predetermined position within the access area.

As set forth hereinabove, the magnetic disk system of the present invention selects the first access to be allowed to another track on the same surface of the same magnetic disk medium, or the second access to be allowed to a track on another recording surface of the magnetic disk medium or a track of another magnetic disk medium, and accesses the next sector after completing the access to one track of the magnetic disk medium allowed by the magnetic head, thereby assuring the continuity of the sectors on the same magnetic disk medium, enabling the patrol seek over the whole surface, and hence reducing the changes of a head crash.

Although the invention has been illustrated and described with respect to exemplary embodiments thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which are within a scope encompassed and equivalents thereof with respect to the feature set out in the appended claims.

What is claimed is:

1. A magnetic disk system comprising:

means for supporting and rotating a plurality of magnetic disk mediums having recording surfaces formatted with a plurality of tracks, each track divided into sectors in a circumferential direction;

magnetic heads respectively positioned on each recording surface of the plurality of magnetic disk mediums, for reading and writing data from and to the magnetic disk mediums;

means for instructing said magnetic heads to perform a seek operation; and control means for controlling data reading and writing from and to the magnetic disk mediums while the seek operation is performed, said control means including determining means for dynamically determining an access state of the magnetic disk mediums by the magnetic heads, and access selecting means for selecting either a first sector access mode in which after sectors on a track in a cylinder on a first magnetic disk medium are accessed, sectors on a track on a second magnetic disk medium in the same cylinder are accessed, or a second sector access mode in which after sectors on the track on the first magnetic disk medium are accessed, sectors on another track on the same recording surface of the first magnetic disk medium are accessed, the selection of sector access modes being based on the determined access state, the access selecting means accessing the magnetic disk mediums according to the selected mode.

2. The magnetic disk system as set forth in claim 1, wherein, in the second sector access mode, said access selecting means accesses the magnetic disk mediums such that the sectors are accessed in an order that is continuous from the outermost circumferential track to the inner track of the magnetic disk medium.

3. The magnetic disk medium as set forth in claim 1, wherein, in the second sector access mode, said access selecting means accesses the magnetic disk mediums such that the sectors are accessed in an order that is continuous from the innermost track to the outer track of the magnetic disk medium.

4. The magnetic disk system as set forth in claim 1, wherein said access selecting means determines, when the magnetic disk medium is accessed, whether access is concentrated for more than a predetermined period in only one area of a track of the magnetic disk medium, and when access is not concentrated for more than the predetermined period in only the one area of the track, said access selecting means selects the first sector access mode, while when access is concentrated in only the one area of the track for the predetermined period, said access selecting means selects the second sector access mode.

5. The magnetic disk system as set forth in claim 1, wherein
said access selecting means determines, the magnetic disk medium is accessed, whether access is concentrated for more than a predetermined period in only one area of a track on the magnetic disk medium, and when access is not concentrated for more than the predetermined period in only the one area of the track, said access selecting means selects the first sector access mode, while when access is concentrated in only the one area of the track for the predetermined period, said access selecting means selects the second sector access mode, and after selecting the second sector access mode, said access selecting means switches the second sector access mode to the first sector access mode when a predetermined period has elapsed.

6. The magnetic disk system as set forth in claim 1, wherein said access state is a frequency of access to at least one track of said plurality of tracks.

7. A magnetic disk system comprising:
structure for supporting and rotating a plurality of magnetic disk mediums having recording surfaces formatted with a plurality of tracks, each track divided into sectors in a circumferential direction;
magnetic heads respectively positioned on each recording surface of the plurality of magnetic disk mediums, for reading and writing data from and to the magnetic disk mediums;
an interface device for instructing said magnetic heads to perform a seek operation; and
a control device for controlling data reading and writing from and to the magnetic disk mediums while the seek operation is performed,
said control device being programmed for
dynamically determining an access state of the magnetic disk mediums by the magnetic heads, and
selecting either a first sector access mode in which after sectors on a track in a cylinder on a first magnetic disk medium are accessed, sectors on a track on a second magnetic disk medium in the same cylinder are accessed, or a second sector access mode in which after sectors on the track on the first magnetic disk medium are accessed, sectors on another track on the same recording surface of the first magnetic disk medium are accessed, the selection of sector access modes being based on the determined access state, the access selecting means accessing the magnetic disk mediums according to the selected mode.

8. In a magnetic disk system having a plurality of magnetic disk mediums having recording surfaces with a plurality of tracks thereon, each track being divided into sectors in a circumferential direction, each of the recording surfaces associated with a respective magnetic head for reading and writing data from and to the magnetic disk mediums, a method for selecting a sector access mode, the method comprising:
determining an access state of the magnetic disk mediums; and
selecting either a first sector access mode in which after sectors on a track in a cylinder on a first magnetic disk medium are accessed, a track on a second magnetic disk medium in the same cylinder is accessed, or a second sector access mode in which after sectors on the track on the first magnetic disk medium are accessed, sectors on another track on the same recording surface of the first magnetic disk medium are accessed, the selection of sector access modes being based on the determined access state, the access selecting means accessing the magnetic disk mediums according to the selected mode.

9. The method as set forth in claim 8, wherein, in the second sector access mode, the magnetic disk mediums are accessed such that the sectors are accessed in a continuous order from the outermost circumferential track to the inner track of the magnetic disk medium.

10. The method as set forth in claim 8, wherein, in the second sector access mode, the magnetic disk mediums are accessed such that the sectors are accessed in a continuous order from the innermost track to the outer track of the magnetic disk medium.

11. The method as set forth in claim 8, further comprising:
determining, when the magnetic disk medium is accessed, whether access is concentrated for more than a predetermined period in only one area of a track of the magnetic disk medium; and
when access is not concentrated for more than the predetermined period in only the one are of the track, selecting the first sector access mode, while when access is concentrated in only the one area of the track for the predetermined period, selecting the second sector access mode.

12. The method as set forth in claim 8, further comprising:
determining, when the magnetic disk medium is accessed, whether access is concentrated for more than a predetermined period in only one area of a track on the magnetic disk medium;
when access is not concentrated for more than the predetermined period in only the one area of the track, selecting the first sector access mode, while when access is concentrated in only the one area of the track for the predetermined period, selecting the second sector access mode; and
after selecting the second sector access mode, switching the second sector access mode to the first sector access mode after a predetermined period has elapsed.

13. The method as set forth in claim 8, wherein said access state is a frequency of access to at least one track of said plurality of tracks.

* * * * *